United States Patent [19]

Cooper

[11] 4,425,313

[45] Jan. 10, 1984

[54] REMOVAL AND RECOVERY OF NITROGEN AND SULFUR OXIDES FROM GASEOUS MIXTURES CONTAINING THEM

[76] Inventor: Hal B. H. Cooper, 4234 Chevy Chase Dr., LaCanada-Flintridge, Calif. 91011

[21] Appl. No.: 311,518

[22] Filed: Oct. 15, 1981

Related U.S. Application Data

[60] Division of Ser. No. 925,850, Jul. 18, 1978, abandoned, which is a continuation-in-part of Ser. No. 804,620, Jun. 8, 1977, abandoned, Ser. No. 823,051, Aug. 10, 1977, abandoned, and Ser. No. 909,026, May 24, 1978, abandoned, which is a continuation of Ser. No. 812,814, Jul. 5, 1977, abandoned, which is a continuation-in-part of Ser. No. 714,792, Aug. 16, 1976, abandoned, said Ser. No. 804,620, is a continuation-in-part of Ser. No. 714,793, Aug. 16, 1976, abandoned, said Ser. No. 823,051, is a continuation-in-part of Ser. No. 714,792.

[51] Int. Cl.$^3$ .................... C01B 21/00; C01B 17/00
[52] U.S. Cl. .................................. 423/235; 423/242; 423/395; 423/421; 423/438; 423/512 A; 423/551; 204/98
[58] Field of Search ............... 423/242 A, 235, 551, 423/395, 421, 438, 512 A; 204/98

[56] References Cited

U.S. PATENT DOCUMENTS

| | | | |
|---|---|---|---|
| 3,336,104 | 8/1967 | Miller | 423/421 |
| 3,832,444 | 8/1974 | Doyle | 423/242 |
| 3,906,080 | 9/1975 | Gopin et al. | 423/512 |
| 3,920,794 | 11/1975 | La Mantia et al. | 423/242 |
| 3,971,844 | 7/1976 | Schneider | 423/242 |

FOREIGN PATENT DOCUMENTS

| | | | |
|---|---|---|---|
| 2147427 | 3/1973 | Fed. Rep. of Germany | 423/242 |
| 1387207 | 12/1964 | France | 423/235 |
| 49-134582 | 12/1974 | Japan | 423/235 |

OTHER PUBLICATIONS

The Condensed Chemical Dictionary, 1961, p. 589.

*Primary Examiner*—Gregory A. Heller
*Attorney, Agent, or Firm*—Joseph E. Mueth

[57] ABSTRACT

A cyclic process for removing lower valence nitrogen oxides from gaseous mixtures includes treating the mixtures with an aqueous media including alkali metal carbonate and alkali metal bicarbonate and a preoxygen oxidant to form higher valence nitrogen oxides and to capture these oxides as alkali metal salts, expecially nitrites and nitrates, in a carbonate/bicarbonate-containing product aqueous media. Highly selective recovery of nitrates in high purity and yield may then follow, as by crystallization, with the carbonate and bicarbonate alkali metal salts strongly increasing the selectivity and yield of nitrates. The product nitrites are converted to nitrates by oxidation after lowering the product aqueous media pH to below about 9.

A cyclic process for removing sulfur oxides from gas mixtures includes treating these mixtures with aqueous media including alkali metal carbonate and alkali metal bicarbonate where the ratio of alkali metal to sulfur dioxide is not less than 2. The sulfur values may be recovered from the resulting carbonate/bicarbonate/sulfite containing product aqueous media as alkali metal sulfate or sulfite salts which are removed by crystallization from the carbonate-containing product aqueous media. As with the nitrates, the carbonate/bicarbonate system strongly increases yield of sulfate or sulfite during crystallization.

Where the gas mixtures include both sulfur dioxide and lower valence nitrogen oxides, the processes for removing lower valence nitrogen oxides and sulfur dioxide may be combined into a single removal/recovery system, or may be effected in sequence.

11 Claims, 4 Drawing Figures

REMOVAL AND RECOVERY OF NITROGEN AND SULFUR OXIDES FROM GASEOUS MIXTURES CONTAINING THEM

This application is a division of Ser. No. 925,850 filed July 18, 1978 now abandoned which was a continuation-in-part of (1) U.S. Ser. No. 804,620, filed June 8, 1977 now abandoned and entitled "Removal and Recovery of Nitrogen Oxides and Sulfur Dioxide from Gaseous Mixtures Containing Them", which in turn was a continuation-in-part of U.S. Ser. No. 714,793 filed Aug. 16, 1976 and entitled "Removal of Nitrogen Oxides from Gaseous Mixtures" (now abandoned); and (2) U.S. Ser. No. 823,051, filed Aug. 10, 1977 and entitled "Removal and Recovery of Nitrogen Oxides and Sulfur Dioxide from Gaseous Mixtures Containing Them", now abandoned which in turn was a continuation-in-part of U.S. Ser. No. 714,792 filed Aug. 16, 1976 and entitled "Removal of Nitrogen Oxides from Gaseous Mixtures" (now abandoned); and (3) U.S. Ser. No. 909,026 filed May 24, 1978, which in turn, was a continuation of U.S. Ser. No. 812,814 filed July 5, 1977 and entitled "Removal and Recovery of Nitrogen Oxides and Sulfur Dioxide from Gaseous Mixtures Containing Them" (now abandoned), which in turn was a continuation-in-part of U.S. Ser. No. 714,792 filed Aug. 16, 1976 andd entitled "Removal of Nitrogen Oxides from Gaseous Mixtures" (now abandoned).

BACKGROUND OF THE INVENTION

Field of the Invention

This invention relates to processes for removing and recovering sulfur dioxide and nitrogen oxides from gas mixtures containing them and especially from mixtures having low concentrations of these substances. Such mixtures include combustion gases produced in burning coal, oil, and low molecular weight hydrocarbons in power plants, industrial furnaces and the like. Lower valence nitrogen oxides such as nitric oxide (NO) are extremely difficult to remove from such mixtures. However, nitrogen oxides are regarded as air pollutants and many nations now mandate reducing their emission into the atmosphere. This invention not only permits compliance with such mandates, but permits recovery of these polluants as commercially valuable products in such quantity and quality that air pollution control may become profitable at best, or at least far less costly.

This invention also relates to processes for the removal of sulfur dioxide from gas mixtures, including those containing sulfur dioxide and nitrogen oxides and regardless of whether removal of such nitrogen oxides from these mixtures is also conducted. These processes achieve significantly higher removal percentages than such widely-adopted processes as the Wellman-Lord method and lime-limestone scrubbing, and permit flexibility in recovering the sulfur values so removed. In particular, recovery of the sulfur in sulfate form through crystallization is rapid, reliable and high in selectivity. Again, the very high removal and recovery of sulfur values as useful products of commerce through this process makes possible a significant improvement in the economics of the heretofore costly removal of sulfur dioxide pollutants from such gas mixtures as combustion gases.

Where a gas mixture includes both sulfur dioxide and lower valence nitrogen oxides, and removal of both is desirable, these new processes for removing and recovering sulfur dioxide and lower valence nitrogen oxides may be combined into a single step, or may be effected sequentially with the latter offering certain processing advantages over the combined process.

The most common oxide of nitrogen in combustion gases is the lower valence nitric oxide (NO), which generally exceeds the concentration of nitrogen dioxide by a factor of about 10. In these combustion gas mixtures, lower valence oxides of nitrogen may be present in concentrations in the range of about 200 to about 20,000 parts per million. But since these mixtures are evolved at such rapid rates, for example, about 1,000,000 cubic feet per minute from a 500 megawatt power plant, the quantity emitted to the atmosphere is very large and creates a serious air pollution problem. The processes of this invention are especially applicable in minimizing these emissions without seriously impeding the high flow rate of the gas stream from the power plant to the atmosphere.

The conversion of lower valence nitrogen oxides to higher valence nitrogen oxides to facilitate their removal from a gas mixture is, broadly, not an entirely new concept. Thus, for example, U.S. Pat. Nos. 1,420,477, 3,733,393, and 3,927,177 propose oxidizing oxides of nitrogen to remove them more easily from gaseous streams. U.S. Pat. No. 3,873,672 employs a related method for removing sulfur dioxide from gas mixtures containing it. All of these primarily seek simple removal of the pollutants and are costly to operate. None discloses removing pollutant nitrogen oxides or sulfur dioxide or both from combustion gases and recovering them as useful products in a practical and economic manner.

Combustion gases from the burning of carbonaceous fuels also include substantial quantities of carbon dioxide. These quantities may be in the range of about 5% to about 20% by volume. Although emission of carbon dioxide to the atmosphere is not presently under severe attack as an environmental problem, capture and recovery of carbon dioxide may be highly desirable to provide raw materials for other commercially valuable products. The recovery techniques that form important parts of the processes of this invention permit recovery of large volumes of carbon dioxide in high purity at low cost, thus contributing the overall efficiency and economy of these processes.

SUMMARY OF THE INVENTION

This invention provides processes for treating gas mixtures including carbon dioxide and nitrogen oxides comprising treating a gas mixture including these gases with aqueous media including alkali metal carbonate, alkali metal bicarbonate and a peroxygen compound meaning hydrogen peroxide and/or an alkali metal salt of peroxycarbonic acid, peroxyphosphoric acid, or alkali metal salts of both peroxycarbonic acid and peroxyphosphoric acid, to convert the lower valence nitrogen oxides to higher valence nitrogen oxides in which alkali metal carbonate/bicarbonate are present in stoichiometric excess of the amount required to form alkali metal salts of the higher valence nitrogen oxides, then recovering a product aqueous media from the treating that includes these alkali metal salts. Preferably, the process also comprises recovering the alkali metal salts from the product aqueous media, and recycling the product aqueous media to the treating process. The gas treating is preferably effected at temperatures in the range of about 50° C. to about 60° C. where the gas mixture is a combustion gas. The oxidant effects conversion from lower valence to higher valence nitrogen. The carbonate/bicarbonate system forms nitrite and nitrate salts of the higher valence nitrogen oxides, thus removing them from the gas mixture and facilitating their recovery. Peroxycarbonates and peroxyphosphates dissociate in water to form hydrogen peroxide. The hydrogen peroxide so formed oxidizes lower valence nitrogen to higher valence nitrogen.

The acceptor system captures and holds the higher valence nitrogen oxides formed in solution in nonvolatile form, and permits the concentration of these salts to rise to a level where recovery is commercially practicable by recycling of the product aqueous media while retaining the nitrogen oxides in solution as nitrite and nitrate salts of alkali metal.

The carbon dioxide concentration in combustion and similar gases is normally in the range of about 5% to about 20%, more commonly about 10% to about 16% by volume. During the treating of gas mixtures in accordance with this invention, the carbon dioxide in the gas mixtures is drawn into solution and forms alkali metal carbonates and bicarbonates by reaction with an alkali metal salt such as the hydroxide.

The presence of these alkali metal carbonates and bicarbonates in the aqueous media and their inter-conversion plays an important part in a number of different ways in the practice of this invention, completely aside from their role in removing oxides of nitrogen and sulfur from the gas stream. For example, the product aqueous media may be treated to recover some or all of the carbon dioxide absorbed. Moreover, the presence of the carbonates in the product aqueous media facilitates the crystallization and recovery of such alkali metal salts as potassium nitrate and potassium nitrite by lowering their solubilitites to a major degree. In the product aqueous media, conversion of carbonate to bicarbonate, as by the addition of carbon dioxide, lowers the pH of the product aqueous media. In turn, that facilitates and expedites the oxidation of nitrite by the oxidant present in the media. Conversely, conversion of bicarbonate to carbonate by heating permits not only the recovery of relatively pure carbon dioxide in large quantities, but also facilitates the recovery of the product potassium nitrate by crystallization in higher purity and yield.

The alkali metal carbonate and bicarbonate used in the aqueous treating media may include any of the alkali metals, but potassium is preferred. Potassium carbonate, in particular, is very soluble in aqueous media, and has the surprising effect of reducing the solubility and raising substantially the temperature at which the nitrate and the nitrite may be crystallized. This means less energy is needed for concentration and refrigeration to cool the product aqueous media to crystallize the nitrate, and a higher potassium nitrate selectivity and yield during crystallization. Potassium nitrate is a valuable commercial product and is especially valuable as a fertilizer, both for its fixed nitrogen and its potassium.

The alkali metal is preferably introduced to the treating step of the processes of this invention as alkali metal hydroxide, although it can be supplied as alkali metal carbonate. Preferably, the alkali metal hydroxide is electrolytically derived from alkali metal halide. Thus, for example, electrolysis of potassium chloride produces potassium hydroxide in aqueous media, as well as hydrogen and chlorine gases. The hydrogen gas may be used to make an oxidant such as hydrogen peroxide.

The chlorine produced in the electrolytic formation of potassium hydroxide from potassium chloride may advantageously be reacted with ethylene to form ethylene dichloride, a precursor to polyvinyl chloride. This not only eliminates the problem of liquefying, storage and transporting highly volatile and hazardous chlorine, but produces at low cost a highly valuable, low-volatility highly stable chemical.

Oxidation of lower valence nitrogen oxides with preferred oxidants produces a product aqueous media including nitrites, nitrates, carbonate and bicarbonates of alkali metal. Because nitrates are more easily removed from such media than are nitrites, the nitrites are desirably oxidized to nitrates. At the carbon dioxide content normally prevailing in combustion gases, e.g., around 14%, both carbonate and bicarbonate are present in the product aqueous media and the pH is likely to be 9 or greater. Surprisingly, lowering the pH to less than about 9 facilitates oxidation of nitrites to nitrates in the product aqueous media. This lowering of the pH may be effected by adding sufficient acid to neutralize the carbonate and convert it to bicarbonate, or, preferably, by adding carbon dioxide to the media.

In these processes, this lowering of pH and conversion of nitrite to nitrate is best effected as the first step in the product recovery so as to utilize any unused oxidant in the product aqueous media remaining from the gas treating and to raise the nitrate concentration prior to its recovery by crystallization. However, this conversion step may be postponed in the recycling of the product aqueous media and may even follow the recovery of nitrate, provided sufficient oxidant is present or is added to the recycling media to effect the oxidation.

Another important step in recovering products from the product aqueous media is decarbonation, where the bicarbonate formed in the treating step of the processes is converted to carbonate and carbon dioxide by heating the product aqueous media and driving off the carbon dioxide. This heating may be effected by steam stripping or by evaporation. The carbon dioxide so made is of high purity and may be captured for use in other processes, used for lowering the pH of the product aqueous media to facilitate oxidation of nitrite to nitrate, or both. Although decarbonation preferably follows conversion of nitrite to nitrate, decarbonation may follow immediately after the gas treating step of the process. Following the conversion of the bicarbonate to carbonate, the product aqueous media is cooled to recover alkali metal nitrates by crystallization.

Since the carbonate/bicarbonate-containing product aqueous media employed in the gas contacting holds alkali metal nitrates and nitrites strongly in solution, the product aqueous media may be recycled through gas treating steps many times to raise the alkali metal nitrate concentration sufficiently high to make product recovery practicable and economic. Thus, when the nitrate concentration rises into the range of about 2% to about 45% based on the weight of the product aqueous media, recovery may then be effected efficiently. Surprisingly, the presence of potassium carbonate in the product aqueous media has a pronounced effect in reducing the solubility of the potassium nitrate and thus makes its recovery much easier and more economical. Not only is the temperature at which crystallization takes place significantly higher than where the potassium carbonate is not present but the yield per pass is also improved.

Where hydrogen peroxide is the oxidant, the peroxide is preferably produced at the site of the treating process by one of the known processes for its products. Incorporating the peroxide supply process directly into the treating process effects considerable economy because most peroxide producing processes require expensive purification steps, such as extraction and distillation, and movement of large quantities of water. For example, where hydrogen peroxide is made by the air oxidation of 2-alkylanthraquinone, hydrogen peroxide is produced in an anthraquinone-containing organic solvent phase, which is then extracted with water. The 2-alkylanthraquinone moiety is alternately oxidized with air and reduced with hydrogen. The water layer containing hydrogen peroxide is then removed and concentrated by distillation. The large amount of water that must be removed and the considerable decomposition and loss of peroxide that takes place during this recovery is costly. These steps may be eliminated by extracting the hydrogen peroxide directly into the recycling aqueous media used in this process, thus avoiding the investment in recovery equipment and the costly recovery concentration steps. Moreover, the hydrogen gas produced in the electrolytic formation of potassium hydroxide or other alkali metal hydroxide may be used to advantage in the anthraquinone reduction step of this process, thereby lowering substantially the cost of producing this oxidant. Alternatively, the peroxygen material may be produced electrochemically by anodic oxidation as for the case where peroxycarbonic or peroxyphosphoric acid are used as the oxidant.

Peroxycarbonates and peroxyphosphates may be, and preferably are, made and regenerated electrolytically by the anodic oxidation of precursors such as potassium carbonate, dipotassium hydrogen phosphate salts, respectively, in a recycling aqueous solution. Thus, for example, the anodic oxidation of potassium carbonate proceeds at highest current efficiency at somewhat below ambient temperatures, in the range of $+10°$ C. to $-20°$ C., and at high concentrations and current densities, e.g., 200–500 amp/square foot, to produce potassium peroxycarbonate. Potassium peroxycarbonate in turn hydrolyzes to hydrogen peroxide at more elevated temperatures and upon acidification.

Two forms of peroxycarbonate are known, the peroxymonocarbonate salt, $K_2CO_4$, and peroxydicarbonate, $K_2C_2O_6$. These hydrolyze to form hydrogen peroxide and the carbonate of the alkali metal by the following reaction:

$$K_2CO_4 + H_2O \rightarrow H_2O_2 + K_2CO_3$$

$$K_2C_2O_6 + 2H_2O \rightarrow H_2O_2 + 2KHCO_3$$

Peroxyphosphates exist in forms analogous to the peroxycarbonate forms described above. Peroxymonophosphoric acid, $H_3PO_5$, and peroxydiphosphoric acid, $H_4P_2O_8$, form various alkali metal salts in aqueous media depending upon the ratio of alkali metal to peroxyphosphate in the media. Mono-, di, tri- and tetra-alkali metal salts of such peroxydiphosphates can be formed with the tetra-salt being the most abundant under the conditions employed in the practice of the process. The peroxyphosphates, in turn, hydrolyze to hydrogen peroxide much as the peroxycarbonates do. Aqueous solutions thus may contain peroxydiphosphate, peroxymonophosphate and hydrogen peroxide. The peroxyphosphates then convert to alkali metal phosphates. The predominant species is the dialkali metal phosphate, such as $K_2HPO_4$, which is then reconverted to the peroxydiphosphate in the oxidant regeneration step of the process. Moreover, alkali metal pyrophosphates, such as tetrapotassium pyrophosphate may be present or may be added to stabilize the peroxygen compounds.

In the electrolytic formation of peroxyphosphates, the key reaction is the initial formation of the peroxydiphosphate which is represented by the following reaction:

$$2\ K_2HPO_4 \xrightarrow{2F} K_4P_2O_8 + H_2$$

The peroxydiphosphate then hydrolyzes in aqueous media as follows:

$$K_4P_2O_8 + H_2O \rightarrow K_2HPO_5 + K_2HPO_4$$

$$K_2HPO_5 + H_2O \rightarrow H_2O_2 + K_2HPO_4$$

In the processes of this invention, the peroxyphosphates may be used alone, or in combination with peroxycarbonates. Mixed peroxyphosphate/peroxycarbonate systems offer the advantages of somewhat improved stability over peroxycarbonate alone, along with improving the current efficiency in the electrolytic regeneration step. Where peroxyphosphate and peroxycarbonate are used together in the process of this invention, they may be made in parallel simultaneously.

The processes of this invention also permit the recovery of sulfur dioxide from gas mixtures regardless of whether nitrogen oxides are present or not and regardless of whether removal of those nitrogen oxides is necessary or desirable. Sulfur dioxide removal may be effected in a number of ways. First, $SO_2$ may be removed from gas mixtures by treating them with an aqueous media including alkali metal carbonate and bicarbonate and oxidant. The ratio of alkali metal to sulfur dioxide (potassium:sulfur dioxide) must be at least about 2. Where lower valence nitrogen oxides are present, the process may be conducted so as to oxidize sulfur dioxide to sulfate with the corresponding alkali metal salts forming in the product aqueous media together with alkali metal nitrites and nitrates. Thereafter, product separation and recovery may proceed as described later.

Rather than removing sulfur dioxide concomitantly with lower valence nitrogen oxides, however, the processes of this invention preferably remove sulfur dioxide separately, and before the lower valence nitrogen oxides are removed. To do this, the gas mixture, including carbon dioxide and sulfur dioxide, with or without lower valence nitrogen oxides, is treated with aqueous media comprising the carbonate and bicarbonate of an alkali metal where the ratio of the alkali metal to sulfur dioxide is at least 2. A product aqueous media is recovered that includes alkali metal carbonate, alkali metal bicarbonate and alkali metal sulfite formed from the sulfur dioxide. Sulfur dioxide removal efficiency of this process is very high, about 99%, and the process is effective whether or not nitrogen oxides are present and whether or not they are necessarily or desirably removed. By contrast, the widely adopted Wellman-Lord and lime-limestone processes for removal of sulfur dioxide from combustion gases are only able to remove about 90% of the sulfur dioxide present from these mixtures.

Although this new sulfur dioxide removal process is superior to the Wellman-Lord process, the Wellman-Lord process concept may alternatively be combined with the processes of this invention for removing lower valence nitrogen oxides from gas mixtures including both sulfur dioxide and lower valence nitrogen oxides where there is a direct need for sulfur dioxide as a product in preference to alkali metal sulfate or sulfite. Moreover, the Wellman-Lord process and others capturing sulfur dioxide as bisulfite may be combined with the sulfur recovery methods of this invention. Thus, where the product aqueous media from gas scrubbing includes such bisulfite, the alkali metal carbonate may be added to the media in an amount sufficient to convert the bisulfite to sulfite. Air oxidation of sulfite to sulfate, and recovery of sulfate by crystallization may then follow.

As in the process for removing and capturing lower valence nitrogen oxides from gas mixtures, the preferred alkali metal is potassium and the preferred source for the potassium is electrolytically derived potassium hydroxide made from the electrolysis of potassium chloride. However, potassium carbonate is also acceptable as a source of potassium.

The sulfur dioxide removal process not only achieves very high removals of sulfur dioxide, but also can recover large quantities of carbon dioxide at low cost. The employment of an excess of alkali metal beyond that needed for reaction with the sulfur dioxide to produce alkali metal sulfite not only ensures a high sulfur dioxide removal efficiency but, depending upon the extent of the excess and the degree of recycling, may also absorb large amounts of carbon dioxide from the gas mixture which can then be recovered in the form of highly pure carbon dioxide upon decarbonation of the alkali metal bicarbonate. The concentration of alkali metal sulfite may be raised to a high level by recycling in a manner similar to the employed with the nitrogen oxides removal. The sulfur values in the product aqueous media are preferably recovered as alkali metal sulfate, although alkali metal sulfite may be crystallized and recovered as such and may be preferable where the alkali metal is sodium. The sulfate is preferably formed by oxidation with a low-cost oxidation such as oxygen, or an oxygen-containing gas such as air. The by-products of such oxidation are gaseous and consist of evaporated water and air. Much water can be evaporated in this step, as the oxidation is exothermic and the heat of reaction can be used directly. Decarbonation and oxidation may also be effected simultaneously if recovery of carbon dioxide is unnecessary or undesirable.

The alkali metal sulfate is recovered from the aqueous media by crystallization. Crystallization of potassium sulfate from the potassium carbonate-containing product aqueous media is particularly efficient. Surprisingly, the solubility of potassium sulfate in potassium carbonate solutions is reduced to very low levels, even where the solution is hot. This is one of the important features of the process. For example, the solubility of potassium sulfate in water at 70° C. is 19.5 grams/100 milliliters of water, but drops to 0.11 gram/100 milliliters of aqueous solution containing 67 grams of potassium carbonate, a remarkable reduction in solubility.

Alkali metal values removed from the product aqueous media with the sulfate or sulfite salts may be be replenished with alkali metal hydroxide or carbonate and fed directly to the recycling product aqueous media.

Where the new sulfur dioxide removal process of this invention is combined with one of the new processes for removing lower valence nitrogen oxides from gas mixtures, even greater advantages accrue from the integration of these two processes into a sequential overall process for removing and preferably recovering both gases.

Where the product aqueous media includes sulfite, nitrite and nitrate salts in solution, these may be separated from one another, as by first converting the nitrites to nitrates, then oxidizing the sulfite to sulfate, and finally by separating the sulfate and nitrate by selective crystallization. The presence of alkali metal carbonates in the product aqueous media reduces the solubility of both sulfate and nitrates and aids in the selectivity of the process, thus permitting first sulfates, at around 70° C., and the nitrates, to crystallize as the product aqueous media is cooled. The solubility of potassium nitrate in aqueous media containing potassium carbonate is reduced to about one tenth of that in water alone. Thus, at 40° C., only 6 grams of potassium nitrate dissolve in 100 milliliters of aqueous solution containing 67 grams potassium carbonate, whereas 64 grams of potassium nitrate will dissolve in 100 milliliters of water alone at 40° C.

Where the gas mixture treated also include some dinitrogen trioxide, nitrogen dioxide, or both, the preferred process for removing sulfur dioxide also tends to trap these oxides as alkali metal nitrites and nitrates along with the sulfur dioxide as sulfite. The resulting product aqueous media may then be subjected to the product recovery steps described above to separate the sulfur values from the nitrates and nitrites. Where removal and recovery of lower valence nitrogen oxides from the same gas stream follow the recovery of sulfur dioxide, the product aqueous media in the sulfur dioxide removal cycle may be bled to the nitrate recovery step of the lower valence nitrogen oxide removal process after the sulfur values in the sulfur dioxide removal product aqueous media cycle are removed.

DESCRIPTION OF THE PREFERRED EMBODIMENTS

The processes of this invention are illustrated in FIGS. 1 through 4, which show the application of the new processes to a mixture of lower valence nitrogen oxides, sulfur dioxide, and carbon dioxide, which are normally found in emissions from the combustion of coal, oil and lower molecular weight hydrocarbons.

Figure 1:
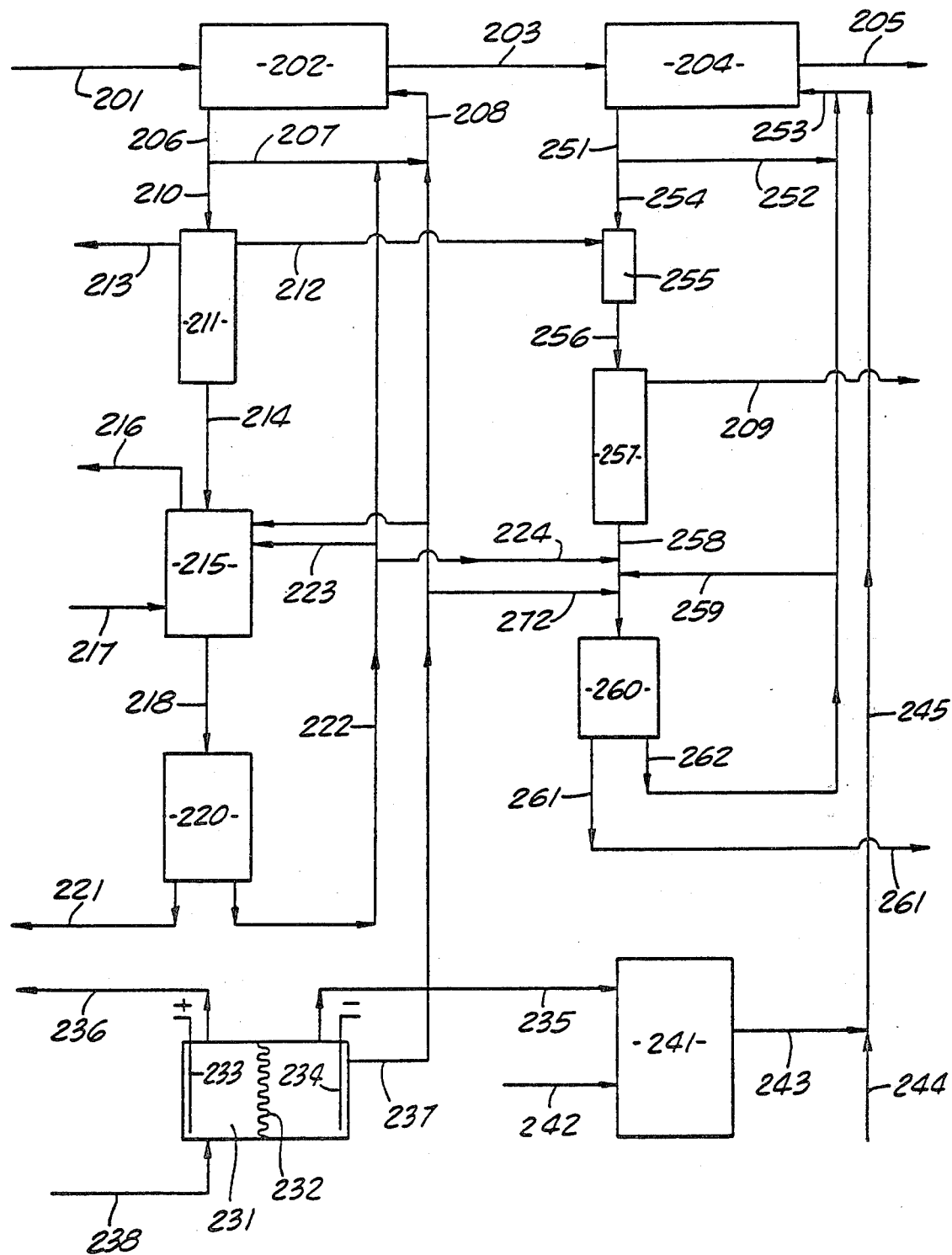

FIG. 1 illustrates an embodiment of the process of the invention where a gas mixture including sulfur dioxide, carbon dioxide, and lower valence nitrogen oxides are treated in two separate stages, the first for the removal of sulfur dioxide, and the second for the removal and recovery of lower valence nitrogen oxides. Sulfur dioxide is removed by employing aqueous media comprising alkali metal carbonate and bicarbonate where the ratio of alkali metal to sulfur dioxide is at least 2. Lower valence oxides of nitrogen are removed from the gas mixture by treating the gas with aqueous media comprising alkali metal carbonate and bicarbonate and hydrogen peroxide.

Figure 2:
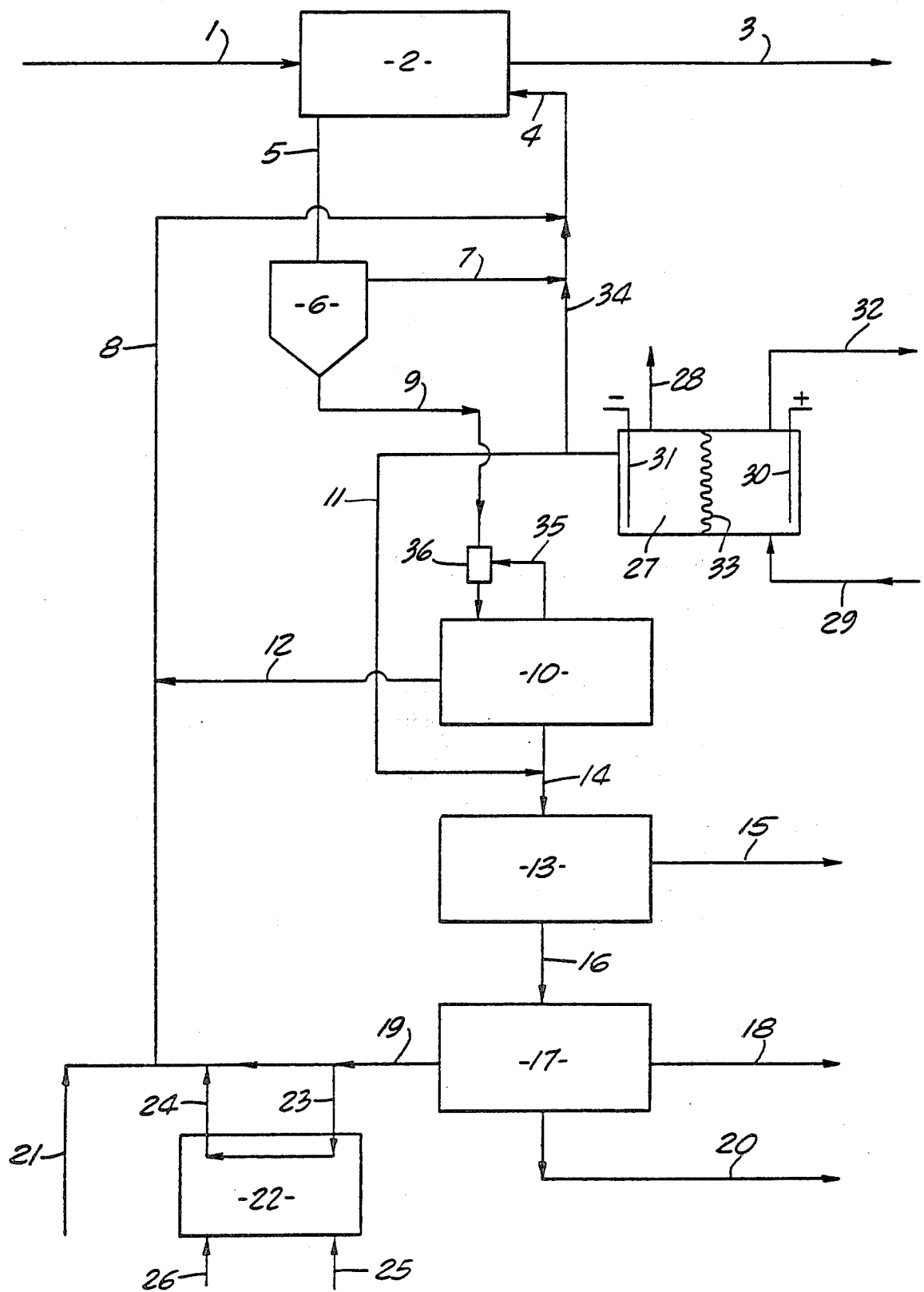

FIG. 2 illustrates an embodiment where the gas mixture includes carbon dioxide and lower valence nitrogen oxides with or without sulfur dioxide, and gas treatment is made to remove all three simultaneously. The oxidant is hydrogen peroxide, the alkali metal is potassium, and the oxides of lower valence nitrogen and sulfur, if present, are removed together.

Figure 3:
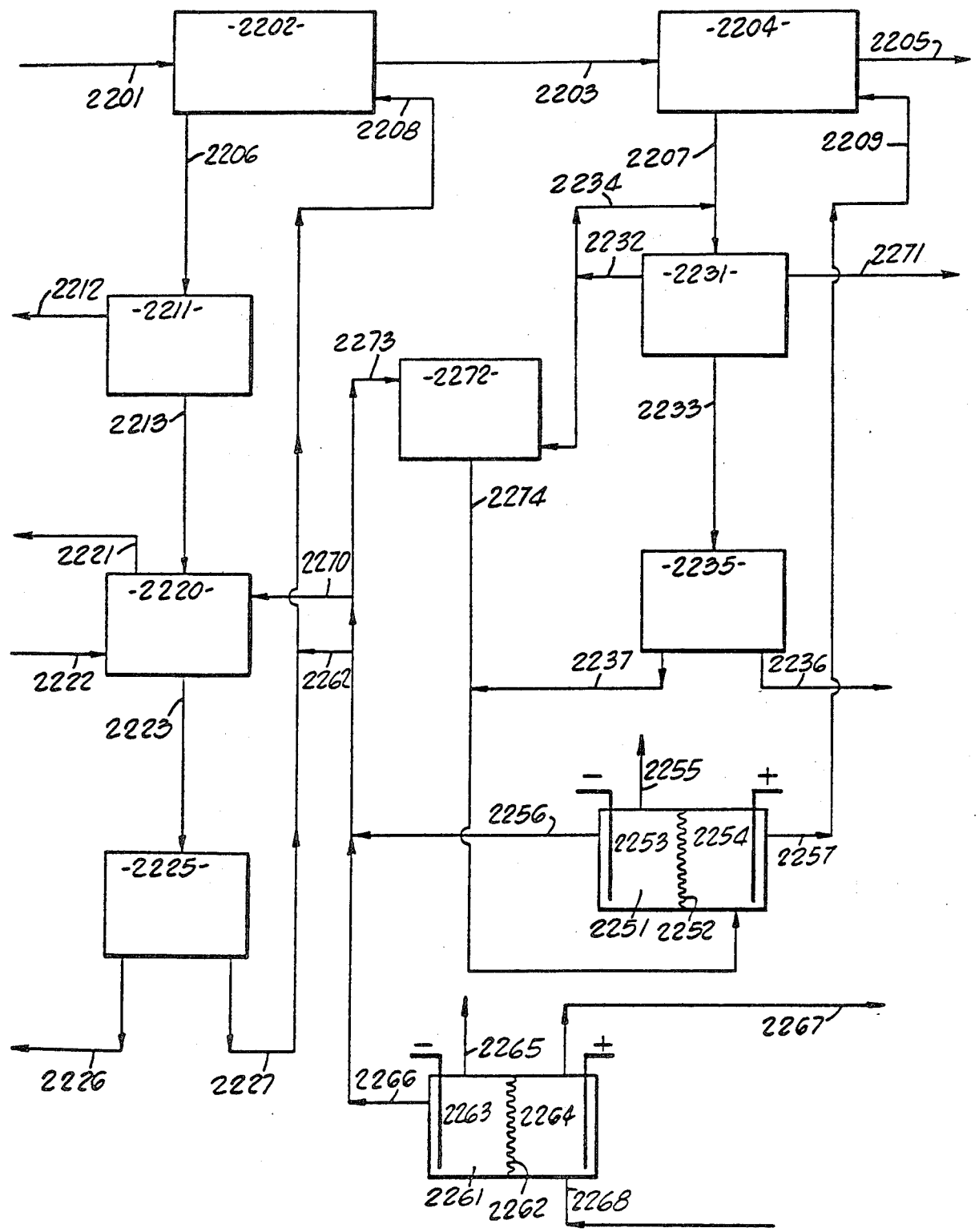

FIG. 3 illustrates an embodiment of the peroxycarbonate process where the gas mixture includes carbon dioxide, sulfur dioxide and lower valence nitrogen oxides and the alkali metal is potassium. The sulfur dioxide and lower valence nitrogen oxides are removed separately. The sulfur dioxide is removed in a first stage as potassium sulfite in a product aqueous media. The lower valence nitrogen oxides in the sulfur dioxide-free gas mixture are removed and recovered in a second stage using peroxycarbonate oxidant and potassium carbonate/bicarbonate.

Figure 4:
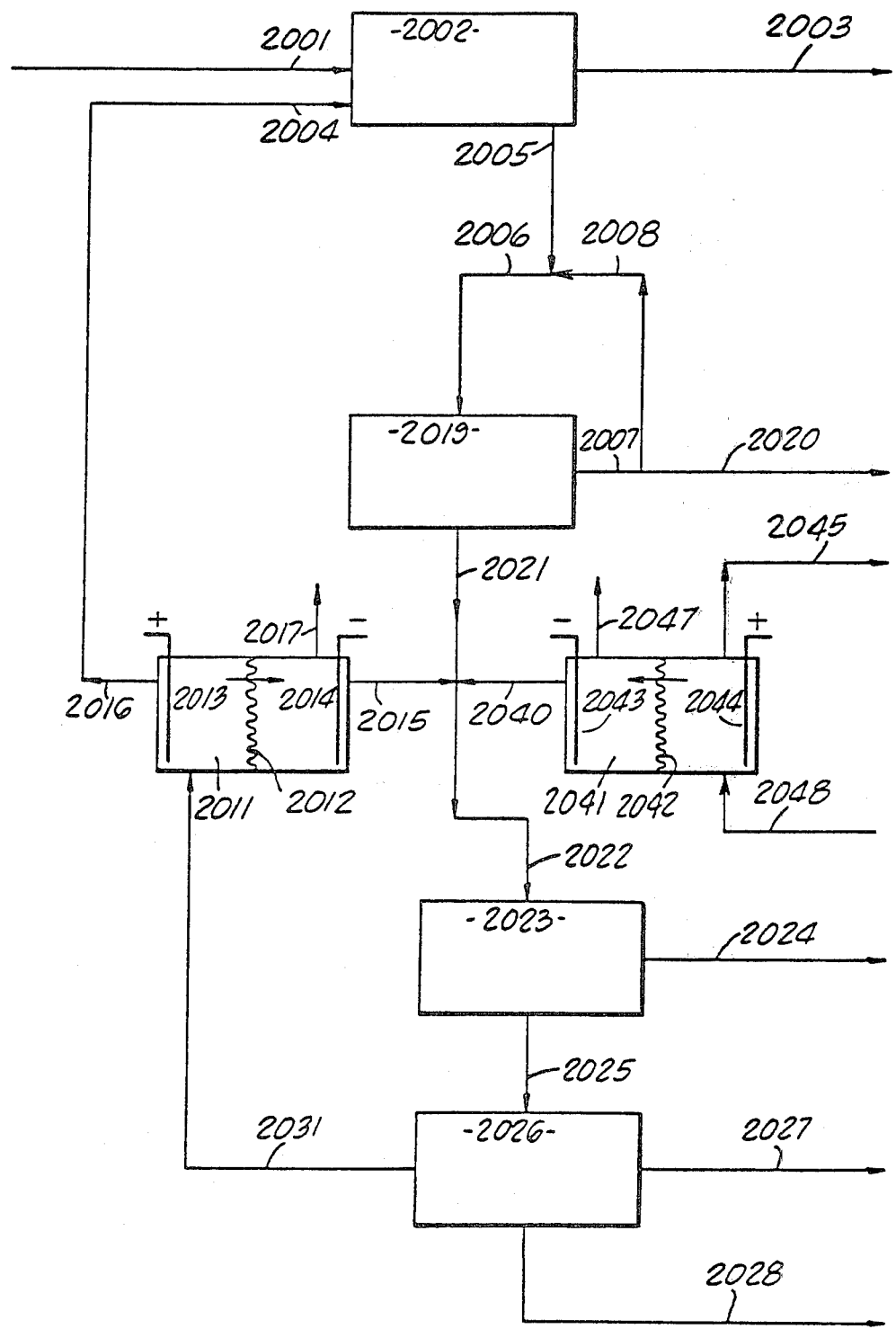

FIG. 4 illustrates another embodiment of the peroxycarbonate process where the gas mixture includes carbon dioxide, sulfur dioxide and lower valence nitrogen oxides and the alkali metal is potassium. The lower valence nitrogen oxides and sulfur dioxide are removed together in a single scrubbing operation and the potassium nitrate and sulfate products are recovered by selective crystallization from the product aqueous media. In this case, substantially all of the oxidation of the lower valence nitrogen oxides and sulfur dioxide to nitrate and sulfate is effected by the peroxycarbonate.

FIG. 1 illustrates the embodiment where the gas mixture includes sulfur dioxide, carbon dioxide, and lower valence oxides of nitrogen, the alkali metal is potassium, the oxidant is hydrogen peroxide, and the sulfur dioxide is removed in the first stage as potassium sulfite in product aqueous media. The lower valence nitrogen oxides in the sulfur dioxide-free gas mixture are removed and recovered in a second stage using the hydrogen peroxide oxidant and aqueous media containing potassium carbonate/bicarbonate.

Removal of sulfur dioxide from gas mixtures and particularly combustion gas mixtures according to this process is strikingly different from any process previously proposed. In particular, this process uses more alkali metal than is required to react with sulfur dioxide so that substantial carbonate and bicarbonate are present in the product aqueous media. Sulfur dioxide is absorbed from the gas mixture and forms sulfite rather than bisulfite as in the Wellman-Lord process. In that process, the scrubber solution is usually slight acidic in order to recover the sulfur values as sulfur dioxide. To that end, Wellman-Lord decomposes sodium bisulfite thermally to form sulfur dioxide and sodium sulfite which is recycled to gas contact. This process calls for an overall ratio of alkali metal to sulfur dioxide of less than 2 and more preferably between 1 and 2, whereas the new process of this invention employs a ratio of alkali metal to sulfur dioxide of at least 2 and preferably at least 3. As a result, the process of this invention achieves removal efficiencies of about 99%, whereas the Wellman-Lord process can only reach a practical maximum of about 90%. Importantly, the process of this invention does not destroy nitrogen oxides present in the gas mixture with the sulfur dioxide. By contrast, in the Wellman-Lord and lime-limestone processes, lower valence nitrogen oxides in the gas mixture are reduced by sulfite-bisulfite solution to nitrogen and nitrous oxide ($N_2O$) and are lost as a potential source of fixed nitrogen. In the process of this invention, the lower valence nitrogen oxides are not destroyed but pass freely to subsequent steps for their removal and recovery.

Referring now to FIG. 1, a gas mixture including sulfur dioxide, lower valence nitrogen oxides and carbon dioxide, such as in a typical combustion gas, enters scrubber 202 via line 201, and is intimately contacted, cocurrently or countercurrently, with aqueous media entering via line 208, and including principally alkali metal carbonate and bicarbonate such as potassium carbonate and bicarbonate, together with a lesser amount of potassium sulfite carried from recycle stream 207. The sulfur dioxide is removed from the gas mixture and transfers to the product aqueous media as potassium sulfite. Makeup potassium hydroxide entering via line 237 and 208 is converted first to potassium carbonate in stream 208 and then to potassium bicarbonate by reaction with the carbon dioxide in the gas mixture. In turn, the potassium bicarbonate reacts with the more acidic sulfur dioxide to form potassium sulfite. Excess potassium carbonate and bicarbonate effect conversion of potassium bisulfite to sulfite. The reactions taking place in scrubber 202 are as follows:

$$2KOH + CO_2 \rightarrow K_2CO_3 + H_2O$$

$$K_2CO_3 + CO_2 + H_2O \rightarrow 2KHCO_3$$

$$SO_2 + 2KHCO_3 \rightarrow K_2SO_3 + 2CO_2 + H_2O$$

There is usually a larger quantity of carbon dioxide in combustion gases than of either the lower valence nitrogen oxides or the sulfur dioxide. Carbon dioxide converts any hydroxide present to carbonate and carbonate to bicarbonate in the scrubbing solution, and lowers pH of the scrubbing media into the range of about 7 to about 10. The precise pH is determined by the partial pressure of carbon dioxide in the gas stream, the temperature, and the ratio of the gas stream to the liquid scrubbing solution.

A substantial portion of the product aqueous media leaving scrubber 202 in line 206 is normally recycled to provide good contact between gas and aqueous phases. That portion removed for product recovery is usually decomposed by boiling or by countercurrent steam stripping in decarbonator 211 in which the potassium bicarbonate is converted to carbon dioxide and potassium carbonate. The following reaction takes place in zone 211 at boiling temperatures:

$$2KHCO_3 \rightarrow K_2CO_3 + CO_2 + H_2O$$

The carbon dioxide and steam so formed leave zone 211 via line 213 from which the water may be condensed and the carbon dioxide dried and recovered as a product, or transferred to converter 255 via line 212. The decarbonated product aqueous media comprising potassium carbonate, potassium sulfite and potassium sulfate in stream 214 passes to sulfite oxidizer/evaporator 215 where potassium sulfite is oxidized to potassium sulfate. Though the oxidation may be done with hydrogen peroxide, atmospheric oxygen costs less and is preferably used. The oxygen-containing gas is fed to oxidizer 215 via line 217.

Oxidation of sulfite to sulfate by atmospheric oxygen proceeds rapidly under neutral or alkaline conditions and may be expedited by operation at elevated pressures and temperatures. Any additional base needed to raise pH may be fed to zone 215 as potassium hydroxide through line 217a, but this is generally not necessary. The reaction taking place in oxidizer 215 is as follows:

$$K_2SO_3 + \tfrac{1}{2}O_2 \rightarrow K_2SO_4$$

Potassium sulfate has a significantly lower solubility in water than potassium sulfite and has a low solubility in potassium carbonate solutions. Accordingly, potassium sulfate may readily be removed from the product aqueous media by crystallization. Normally, the discharge 218 from sulfite oxidizer 215 is a slurry because of substantial water removal and low solubility of potassium sulfate in product aqueous media. The slurry in line 218 may then be cooled and potassium sulfate removed in crystallizer-separator 220. The recovered potassium sulfate is normally centrifuged and removed via line 221 for drying and packaging, and the product aqueous media is removed in line 222.

Product aqueous media in line 222, which is principally potassium carbonate, may also contain a small amount of potassium sulfate, and unoxidized potassium sulfite. The aqueous mother liquor is recycled to zone 202 for scrubbing via lines 222, 207 and 208. Some of this may be bled, however, via lines 223 and 224, respectively, to oxidizer 215, to line 258, or both. Additional potassium hydroxide is added to the recycling product aqueous media via line 237 to compensate for potassium removed in the potassium sulfate product.

The gas stream passing from scrubber 202 via line 203, substantially free of sulfur dioxide, passes to scrubber 204 where lower valence nitrogen oxides and some carbon dioxide are removed. Clean gas emerges via line 205. The prior removal of sulfur dioxide reduces substantially the quantity of oxidant required, and precludes formation of potassium sulfate during removal and recovery of lower valence nitrogen oxides. Potassium makeup required for producing the potassium nitrate product may be from potassium carbonate via line 224, from potassium hydroxide electrolytically made in cell 231, or both.

Product aqueous media comprising unconsumed hydrogen peroxide, potassium nitrate and potassium nitrite, potassium carbonate and potassium bicarbonate, passes from zone 204 via line 251 and is recycled to scrubber 204 via lines 252 and 253, until the concentration of nitrite, nitrate or both reaches a predetermined minimum. Thereafter, at least some of the product aqueous media in line 251 enters the product recovery cycle via line 254. Preferably, the product aqueous media to be subjected to product recovery passes through line 254 to nitrite converter 255. Carbon dioxide from decarbonator 211 passes via line 212 to converter 255 to convert carbonate to bicarbonate, thus lowering the pH to less than about 9, and facilitating oxidation of nitrite to nitrate by unconsumed oxidant hydrogen peroxide. Product aqueous media, now rich in potassium nitrate and potassium bicarbonate, passes from nitrite converter 255 via line 256 to decarbonator/evaporator 257. There, a substantial portion of bicarbonate is converted to carbonate and carbon dioxide by thermal decomposition. Carbon dioxide and water pass overhead via line 209 and the carbon dioxide may be recovered and used elsewhere, or may be fed into line 254 to convert potassium carbonate to bicarbonate in that line and to facilitate oxidation of potassium nitrite there to nitrate. Pressurizing carbon dioxide aids conversion of carbonate to bicarbonate and facilitates formation of carbonic acid in the product aqueous media. Oxidation of nitrite to nitrate proceeds faster when carbonic acid is present and carbonate is absent.

The product aqueous media leaving the decarbonation tower 257 via line 258 contains primarily potassium nitrate and nitrite and potassium carbonate, and is cooled in crystallizer 260 to around 10° C. Thereupon, potassium nitrate crystallizes and is removed via line 261 following centrifuging. Potassium carbonate and potassium nitrite remain in the product aqueous media which recycles via lines 262 and 253 to zone 204 following addition thereto of oxidant hydrogen peroxide via lines 245 and 253. Some of the recycling aqueous media may be bled into line 258 from line 245 via line 259.

Hydrogen peroxide may be produced on site, as described above, from line 243, or from an outside source via line 244. Where peroxide is made on site, hydrogen is fed to plant 241 via line 235 and air, via line 242. Preferably, hydrogen is supplied in whole or in part from electrolytic cell 231.

Makeup potassium is conveniently produced in electrolytic cell 231 as well. To cell 231, a concentrated solution of potassium chloride is fed via line 238 to the anode compartment where it is electrolytically converted to chlorine at anode 233 and to potassium hydroxide and hydrogen at cathode 234. Chlorine passes from the cell via line 236 and hydrogen via line 235. Cationic membrane 232 is used to produce a chloride-free potassium hydroxide product which passes from cell 231 via line 237.

Referring now to FIG. 2, a combustion gas mixture including carbon dioxide, sulfur dioxide and lower valence nitrogen oxides enters scrubber 2 where the gas is intimately contacted, either cocurrently or countercurrently, with aqueous media entering scrubber 2 via line 4. The gas mixture exits scrubber 2 via line 3, containing only small amounts of lower valence nitrogen oxides and virtually no sulfur dioxide.

The aqueous media entering scrubber 2 via line 4 includes potassium nitrite and nitrate, carbonate and bicarbonate, and an oxidant, hydrogen peroxide. Recycled aqueous media may also enter scrubber 2 via lines 7 and 4. The recycled aqueous media also includes some alkali metal sulfate.

The following reactions take place:
Reactions of CO₂

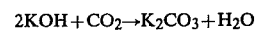

$$2KOH + CO_2 \rightarrow K_2CO_3 + H_2O$$

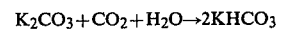

$$K_2CO_3 + CO_2 + H_2O \rightarrow 2KHCO_3$$

NO Conversion

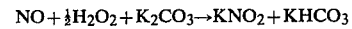

$$NO + \tfrac{1}{2}H_2O_2 + K_2CO_3 \rightarrow KNO_2 + KHCO_3$$

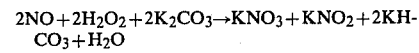

$$2NO + 2H_2O_2 + 2K_2CO_3 \rightarrow KNO_3 + KNO_2 + 2KHCO_3 + H_2O$$

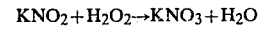

$$KNO_2 + H_2O_2 \rightarrow KNO_3 + H_2O$$

SO₂ Conversion

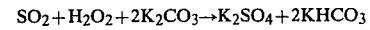

$$SO_2 + H_2O_2 + 2K_2CO_3 \rightarrow K_2SO_4 + 2KHCO_3$$

If the gas mixture includes a large amount of carbon dioxide, the potassium carbonate formed in scrubber 2 changes to bicarbonate in large part. This lowers the pH in scrubber 2 into the range of about 7 to about 10. Where the pH is within this range, varies with the temperature, carbon dioxide partial pressure in the gas mixture, and the quantity of potassium carbonate and bicarbonate present. Hydrogen peroxide oxidizes the oxides of lower valence nitrogen to higher valence nitrogen oxides which then react with the potassium bicarbonate and carbonate in the aqueous media to form potassium nitrate and nitrite. The sulfur dioxide present oxidizes to potassium sulfate. The scrubbing system operates most economically when all of the oxidant is consumed in the scrubbing step, and that is readily accomplished with countercurrent flow of scrubbing solution to the gas mixture.

The product aqueous media from the treating operation, including potassium nitrate, potassium nitrite, potassium sulfate, potassium carbonate and potassium bicarbonate, leaves scrubber 2 through line 5 and passes to separator 6. From there, a number of process variations may be employed for separating and recovering the products in that media.

Potassium sulfate has a low solubility in water compared to the other products in the product aqueous media particularly with potassium carbonate present. By contrast, potassium carbonate and potassium nitrite are highly soluble even when cold, compared to the others. By converting most of the bicarbonate to carbonate, the sulfate and nitrate potassium salts may be crystallized from the solution with no bicarbonate contamination. The carbonate and nitrite remain in solution. The major portion of the product aqueous media is recycled through line 7 to increase the concentration of potassium nitrate in the product aqueous media to a sufficiently high level to make product recovery practicable and economic without excessive evaporation.

Because of its low water solubility and the high sulfur content of many fossil fuels, potassium sulfate tends to crystallize from solution and is removed from separator 6 via line 9 together with the product aqueous media from which potassium nitrate and sulfate products are to be recovered. Product aqueous media is removed via line 7 from separator 6 and may be recycled to scrubber 2 through line 4.

The product aqueous media passes via line 9 to decarbonator-evaporator 10 where a portion of the bicarbonate is normally converted to carbonate with removal and recovery, if desired, of carbon dioxide. Conversion of bicarbonate to carbonate is desirable because potassium bicarbonate tends to crystallize with and contaminate the potassium nitrate, but potassium carbonate will not. The pH of the product aqueous media which includes potassium nitrate, potassium nitrite, potassium bicarbonate and potassium carbonate, together with residual potassium sulfate, may be further adjusted by adding potassium hydroxide through line 11 to prevent crystallization of potassium bicarbonate. Distillate water and carbon dioxide leave evaporator-decarbonator 10 by line 12. The decarbonation and carbon dioxide formation are effected by thermally decomposing bicarbonate by evaporation or steam stripping as follows:

$$2KHCO_3 \rightarrow K_2CO_3 + CO_2 + H_2O$$

The carbon dioxide removed via line 12 may be recovered as a product or partially used to convert potassium carbonate to bicarbonate to facilitate the oxidation of potassium nitrite to nitrate.

Concentrated solution from evaporator-decarbonator 10 passes to crystallizer-separator 13 via line 14 for recovery of crystalline potassium sulfate via line 15. Product aqueous media exiting the potassium sulfate crystallizer-separator 13 in line 16 is then deep cooled in crystallizer-separator 17 to recover potassium nitrate which is removed via line 18. Potassium nitrite, which is highly water soluble, remains in solution in the potassium carbonate-containing aqueous media, and recycles in lines 19, 8 and 4 and is ultimately oxidized to potassium nitrate and recovered as such. Impurities accumulated in the product aqueous media may be purged through line 20. This purged material may be used as a fertilizer or fertilizer supplement.

The potassium carbonate/potassium bicarbonate system performs numerous important functions in the practice of this invention. For example, in the treating step, this system insures substantial removal of sulfur dioxide and lower valence nitrogen oxides from the gas mixture. In the product recovery, the system lowers the water solubility of potassium sulfate and potassium nitrate, making recovery of each more selective and higher in yield, thus reducing energy needs for evaporation and refrigeration.

The following data show the unexpectedly strong impact of potassium carbonate in reducing the solubilities of potassium sulfate and potassium nitrate in aqueous media. Potassium sulfate has a solubility at 70° C. of 19.5 grams in 100 milliliters of water, but only 0.11 gram in 100 milliliters of aqueous solution containing 68 grams of potassium carbonate. Potassium nitrate has a solubility at 20° C. of 33 grams in 100 milliliters of water, but only 2.8 grams in 100 milliliters of water containing 68 grams of potassium carbonate at 20° C. Thus, potassium sulfate can be crystallized with substantially complete removal from aqueous potassium carbonate at temperatures above about 70° C., following which the potassium nitrate may be crystallized with increasing recoveries at lower temperatures, say from about 10° C. to about 50° C. Separation and recovery of substantially pure sulfate and nitrate products is an important and unexpected result of this process, and makes possible the recovery of commercial quantities of these products from gas mixtures containing low concentrations of sulfur dioxide and lower valence nitrogen oxides for the first time.

The product aqueous media in line 19, which contains principally potassium carbonate and lesser amounts of potassium nitrite and nitrate, is recharged with hydrogen peroxide oxidant. This may be fed via line 21 from an outside source, or may be produced by autooxidation of certain organic compounds in an on-site hydrogen peroxide plant 22.

In such a plant 22, hydrogen peroxide may be produced by the cyclic reduction and oxidation of an alkyl anthraquinone such as 2-ethylanthraquinone in an organic solvent, as follows:

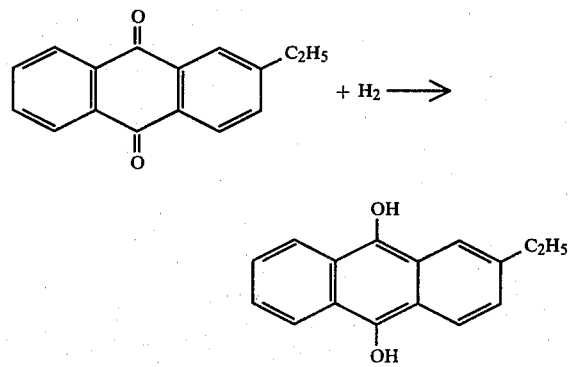

-continued

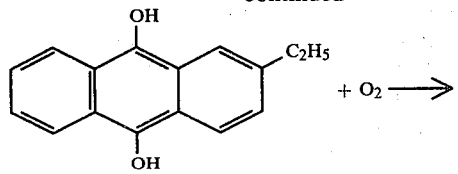

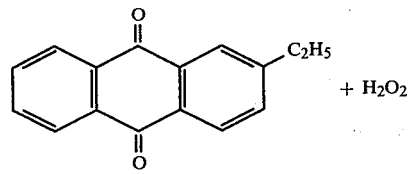

Hydrogen peroxide may be extracted from the anthraquinone-containing organic phase directly into the recycling product aqueous media entering plant 22 through line 23 and leaving through line 24, or into a separate water stream which is then added to the recycling product aqueous media. The hydrogen entering plant 22 via line 25 may be supplied from electrolytic cell 27 via line 28. This lowers the cost of producing hydrogen peroxide significantly because hydrogen is expensive.

Makeup potassium is conveniently produced as potassium hydroxide in electrolytic cell 27. Saturated potassium chloride solution enters cell 27 through line 29, and is electrolytically converted to chlorine at anode 30 and to potassium hydroxide and hydrogen at cathode 31. Chlorine passes from the cell via line 32 and hydrogen via line 28. A cationic-exchange membrane 33 is used to obtain a potassium chloride-free potassium hydroxide product which passes from cell 27 via line 11. A portion of the potassium hydroxide solution is fed via line 34 to line 4; another portion, to crystallizer 13 via line 11 for adjustment of pH there to a value in the range of about 10 to about 12.

To convert nitrite remaining in the product aqueous media to nitrate rapidly, carbon dioxide produced in the decarbonation step may be fed via line 12 to line 8. There, carbon dioxide converts the carbonate to bicarbonate as follows:

$$CO_2 + K_2CO_3 + H_2O \rightarrow 2KHCO_3$$

Optionally, carbonation and oxidation may be expedited by pressurizing carbon dioxide into recycling product aqueous media in line 8. Various mineral acids may alternatively be used to convert carbonate to bicarbonate to expedite the nitrite oxidation but they are costlier than the carbon dioxide made in this process.

Conversion of nitrite to nitrate, and recycle of oxidant-fortified product aqueous media to scrubber 2 via line 4 makes the process fully cyclic.

Referring to FIG. 3, gas stream 2201 containing at least one lower valence nitrogen oxide, sulfur dioxide and carbon dioxide enters zone 2202 where it is intimately contacted, countercurrently or cocurrently, with aqueous media entering via line 2208, and including potassium sulfite, potassium carbonate, potassium bicarbonate, potassium hydroxide and a small amount of residual potassium sulfate. The potassium hydroxide is converted to potassium carbonate which in turn is converted to potassium bicarbonate by the carbon dioxide in the gas mixture. The bicarbonate reacts with the more acidic sulfur dioxide to form potassium sulfite. Excess potassium carbonate and bicarbonate effect conversion of potassium bisulfite to sulfite. The reactions taking place in scrubber 2202 are as follows:

$$2KOH + CO_2 \rightarrow K_2CO_3 + H_2O$$

$$K_2CO_3 + CO_2 + H_2O \rightarrow 2KHCO_3$$

$$SO_2 + KHCO_3 \rightarrow KHSO_3 + CO_2$$

$$KHSO_3 + KHCO_3 \rightarrow K_2SO_3 + CO_2 + H_2O$$

From scrubber 2202, the product aqueous media passes via line 2206 to decarbonator 2211. There, bicarbonate is converted to carbon dioxide and carbonate by heating the product aqueous media. Carbon dioxide is taken overhead via line 2212, and the carbonate-containing product aqueous media passes via line 2213 to oxidizer 2220.

Steam 2206 or stream 2213 passes to sulfite oxidizer 2220 where at least a portion of the sulfite is oxidized to sulfate. Though this oxidation may be done with hydrogen peroxide, as described in reference to FIG. 2 or 4, significant economies may result where the oxidant is oxygen or a gas containing oxygen, such as air. The oxidation of sulfite is preferably carried out under alkaline conditions. Additional alkali needed to raise the pH may be introduced through line 2270 as either potassium hydroxide or potassium carbonate. An oxygen-containing gas, usually air, is fed to the oxidizer 2220 through line 2222. The exit gases leave through line 2221. The reaction taking place in sulfite oxidizer 2220 is as follows:

$$K_2SO_3 + \tfrac{1}{2}O_2 \rightarrow K_2SO_4$$

Potassium sulfate has a considerably lower solubility in the aqueous media than potassium sulfite and may be selectively removed by crystallization. Normally, the discharge from the sulfite oxidizer 2220 leaving through line 2223 is in slurry form because considerable concentration and water removal takes place in the sulfite to sulfate oxidation reaction. The slurry in line 2223 may be cooled and potassium sulfate crystallized therefrom in crystallizer-separator 2225. The recovered potassium sulfate is removed via line 2226, and the aqueous media in line 2227 containing principally potassium carbonate and unoxidized potassium sulfite is fortified with potassium hydroxide added through lines 2262 and 2266 and then recycled to zone 2202 via line 2227 and 2208.

The sulfur dioxide-free gas stream 2203 from scrubber 2202 passes to scrubber 2204 where lower valence nitrogen oxides are oxidized and removed as described in reference to FIG. 2 or 4. Prior removal of sulfur dioxide reduces the need for oxidant in scrubber 2204 because only lower valence nitrogen oxides remain to be removed. Because no potassium sulfate is produced in the second stage, crystallization and recovery of the potassium nitrate produced in the second stage is simplified. Clean gas exits scrubber 2204 via line 2205. The large amount of carbon dioxide present in the gas mixture converts a portion of the potassium carbonate entering in line 2209 to potassium bicarbonate in scrubber 2204 and the product aqueous media thus comprises primarily potassium nitrite and nitrate and potassium carbonate and bicarbonate.

Product aqueous media passes from scrubber 2204 via line 2207 to a decarbonation evaporator or stripping tower 2231 in which a substantial portion of the bicarbonate is converted to carbonate by thermal decomposition or steam stripping in accordance with the following reaction:

$$2KHCO_3 \rightarrow K_2CO_3 + CO_2 + H_2O$$

Carbon dioxide may be withdrawn as a product via line 2271, or fed via line 2232 to carbonator 2272 and used to carbonate potassium hydroxide or fed via line 2234 to line 2207 to lower the pH there by converting carbonate to bicarbonate. This facilitates oxidation of potassium nitrite to potassium nitrate and utilizes unreacted oxidant remaining in the product aqueous media.

Conversion of potassium bicarbonate in the solution to potassium carbonate insures a higher electrical efficiency in peroxycarbonate electrolytic cell 2251 because the current efficiency decreases as the quantity of potassium bicarbonate or hydroxide increases.

The peroxycarbonate electrolytic cell produces a higher electrical efficiency where only a portion of the potassium carbonate feed is converted to peroxycarbonate; usually about 10-40% is converted. An excess of potassium carbonate over that converted to peroxycarbonate is therefore desirable. This excess passes through the process, is partially converted to bicarbonate in scrubber 2204, and then to carbonate in decarbonator 2231, as it recycles. Only the amount of potassium needed to form potassium nitrate is removed.

Product aqueous media leaving decarbonator 2231 via line 2233 includes potassium nitrate with the major portion of the carbonate-bicarbonate in the form of potassium carbonate. The solution is deep-cooled ($-10°$ C. to $+20°$ C.) in crystallizer 2235 and the potassium nitrate product crystallized, centrifuged, and removed via line 2236. Potassium carbonate has high solubility even when cold (around 50% at 0° C.) and remains in solution in aqueous media.

The aqueous media containing principally potassium carbonate leaves crystallizer 2235 via line 2237, joins with potassium carbonate-containing stream 2274 passing from carbonator 2272, and the combined stream passes to the anode compartment of peroxycarbonate cell 2251. In cell 2251, potassium ions migrate through the hydraulically impermeable diaphragm or cationic permselective membrane 2252 and are converted to potassium hydroxide at cathode 2253. Hydrogen gas also forms at cathode 2253 and exits cell 2251 via line 2255. Potassium hydroxide leaves cell 2251 via line 2256, and passes to line 2266, 2270 and 2273. Line 2273 enters carbonator 2272 where potassium hydroxide and carbon dioxide combine to produce potassium carbonate.

Makeup potassium as potassium may be made in electrolytic cell 2261. Potassium chloride fed to the cell via line 2268, forms chlorine gas at anode 2264, and potassium hydroxide and hydrogen at cathode 2263. Cationic permselective membrane 2262 permits passage of potassium ions, but prevents passage of chloride ions. Hydrogen exits the cell via line 2265; chlorine, via line 2267. Potassium hydroxide forms at cathode 2263, and exits cell 2261 via line 2266. Makeup potassium is fed to the system from line 2266.

Referring now to FIG. 4, a gas mixture including sulfur dioxide, carbon dioxide and lower valence nitrogen oxides enters gas scrubber 2002 via line 2001. In scrubber 2002, the mixture is intimately contacted, either cocurrently or countercurrently, with aqueous media comprising potassium peroxycarbonate, hydrogen peroxide, and potassium carbonate and potassium bicarbonate entering via line 2004. Though the drawing shows only one scrubber, there may be several, and each may have multiple stages. The gas mixture exits scrubber 2002 via line 2003, containing only small amounts of lower valence nitrogen oxides and virtually no sulfur dioxide. The product aqueous media passes from scrubber 2002 via lines 2005 and 2006 to decarbonator-evaporator 2019.

The following reactions take place:

$$2KOH + CO_2 \rightarrow K_2CO_3 + H_2O$$

$$K_2CO_3 + CO_2 + H_2O \rightarrow 2KHCO_3$$

$$K_2CO_4 + 2H_2O + CO_2 \rightarrow H_2O_2 + 2KHCO_3$$

$$K_2C_2O_6 + 2H_2O \rightarrow H_2O_2 + 2KHCO_3$$

NO Removal $$NO + \tfrac{3}{2}H_2O_2 + K_2CO_3 \rightarrow KNO_2 + KHCO_3$$

$$2NO + 2H_2O_2 + 2K_2CO_3 \rightarrow KNO_2 + KNO_3 + H_2O + 2KHCO_3$$

$$KNO_2 + H_2O_2 \rightarrow KNO_3 + H_2O$$

$$2NO + 3H_2O_2 + 2KHCO_3 \rightarrow 2KNO_3 + 2CO_2 + 4H_2O$$

NO$_2$ Removal $$2NO_2 + 2K_2CO_3 + H_2O \rightarrow KNO_2 + KNO_3 + 2KHCO_3$$

$$(NO + NO_2) + 2K_2CO_3 + H_2O \rightarrow 2KNO_2 + 2KHCO_3$$

SO$_2$ Removal $$SO_2 + H_2O_2 + 2KHCO_3 \rightarrow K_2SO_4 + 2CO_2 + H_2O$$

There is usually a larger quantity of carbon dioxide in combustion gases than of either the lower valence nitrogen oxides or the sulfur dioxide. Carbon dioxide converts any hydroxide present to carbonate and carbonate to bicarbonate in the scrubbing solution, and lowers pH of the scrubbing media into the range of about 7 to about b 10. The precise pH is determined by the partial pressure or carbon dioxide in the gas stream, the temperature, and the ratio of the gas stream to the liquid scrubbing solution.

The peroxycarbonate solution entering scrubber 2002 via lines 2004 and 2016 from electrolytic cell 2011 contains potassium peroxycarbonate, hydrogen peroxide, potassium carbonate and potassium bicarbonate. When this solution enters scrubber 2002, the pH there falls and the temperature rises. This facilitates conversion of peroxycarbonate to hydrogen peroxide. The hydrogen peroxide and peroxycarbonate oxidize the lower valence nitrogen oxides to higher valence nitrogen oxides which then react with the potassium carbonate and potassium bicarbonate to form potassium nitrate and nitrite. The sulfur dioxide present is oxidized to potassium sulfate.

Where sulfur dioxide is present in high concentration in the gas mixture, the concentration of potassium sulfate in the effluent from scrubber 2002 may be such that potassium sulfate crystallizes and a slurry is obtained.

The product aqueous media from the treating operation including potassium nitrate, potassium nitrite, potassium sulfate, potassium carbonate and potassium bicarbonate, leaves scrubber 2002 through line 2005 and passes to decarbonator 2019. From there, a number of process variations may be employed for separating and recovering the products in the media.

Potassium sulfate has a low solubility in water compared to the other products in the product aqueous media, particularly with potassium carbonate present. By contrast, potassium carbonate and potassium nitrite are highly soluble, even in the cold, compared to the others. By converting most of the bicarbonate to carbonate, the sulfate and nitrate potassium salts may be crystallized from the solution with no bicarbonate contamination. The carbonate and nitrite remain in solution. The major portion of the product aqueous media is recycled to increase the concentration of potassium nitrate in the aqueous media to a sufficiently high level to make product recovery practicable and economic without excessive evaporation.

In the removal of lower valence nitrogen oxides from the gas stream, an appreciable portion of the alkali metal salts formed appears as the nitrite. Though the nitrite can be removed as such, it is preferable to convert it and recover as the nitrate. Converting the carbonate to bicarbonate and lowering the pH to less than 9 facilitates rapid conversion of nitrites to nitrates by the hydrogen peroxide and peroxycarbonate. The peroxide or peroxycarbonate may be left over from the scrubbing, or may be added to the product aqueous media leaving scrubber 2022. Alternatively, the conversion may be effected as the aqueous media recycles to scrubber 2002 via line 2016.

Though carbonate can be converted to bicarbonate and the pH lowered with various mineral acids, this is preferably done by adding carbon dioxide. More favorable economics result where carbon dioxide produced in the process is used.

The aqueous scrubbing media leaving scrubbing zone 2002 in line 2005 is combined with carbon dioxide fed in by line 2008. There, carbon dioxide converts carbonate to bicarbonate by the following reaction:

$$CO_2 + K_2CO_3 + H_2O \rightarrow 2KHCO_3$$

While not necessary, the carbonation and oxidation may be facilitated by pressurizing carbon dioxide into line 2005 before the product aqueous media enters decarbonator 2019. Oxidation of nitrite to nitrate in line 2005 proceeds as follows:

$$KNO_2 + H_2O_2 \rightarrow KNO_3 + H_2O$$

Using the residual peroxycarbonate in the product aqueous media leaving scrubber 2002 is most efficient because peroxycarbonate loss is minimized.

Following conversion of nitrite to nitrate in line 2006, the product aqueous media, now containing principally potassium nitrate, potassium sulfate and potassium bicarbonate, passes to decarbonator-evaporator 2019, from which carbon dioxide and steam are removed and leave via lines 2007 and 2020. A portion is recycled via line 2008 for carbonation in line 2006. Conversion of bicarbonate to carbonate is desirable because potassium bicarbonate tends to crystallize with and contaminate the potassium nitrate, but potassium carbonate will not. The pH of the product aqueous media may be further adjusted by adding potassium hydroxide through line 2040 to 2021 to prevent crystallization of potassium bicarbonate. The decarbonation is effected by thermally decomposing bicarbonate by boiling or steam stripping as follows:

$$2KHCO_3 \rightarrow K_2CO_3 + CO_2 H_2O$$

The carbon dioxide removed via line 2007 may be recovered as a product or partially used to convert potassium carbonate to bicarbonate to facilitate the oxidation of potassium nitrite to nitrate. A substantial portion of the bicarbonate may be converted to carbonate in this manner. When necessary, evaporation may be conducted advantageously at this point, although it can be done at other stages as well.

Concentrated product aqueous media from decarbonator 2019 passes via lines 2021 and 2022 to crystallizer 2023, where potassium sulfate is recovered via line 2024. The presence of potassium carbonate in the aqueous media reduces markedly the solubility of potassium sulfate. Makeup potassium hydroxide may be added via line 2015 and 2040 or to the scrubber feed in line 2004. Product aqueous media from crystallizer-separator 2023 passes via line 2025 to crystallizer 2026 where, following cooling, say to a temperature in the range of about 30° C. to about −10° C., potassium nitrate is crystallized and withdrawn via line 2027. The residual solution, which now contains mostly potassium carbonate, is recycled through line 2031 to the anode compartment of electrolytic cell 2011 for conversion to potassium peroxycarbonate.

The oxidant solution leaves cell 2011 via line 2016 to provide fresh aqueous scrubbing media for contacting the gas stream. The electrolytic cell employs a cationic-selective ion-exchange membrane 2012 or hydraulically impermeable diaphragm through which potassium ions migrate to the cathode 2014 where they discharge to produce potassium hydroxide and hydrogen gas. The hydrogen gas exits through line 2017 and the potassium hydroxide through line 2015 to join the product recovery stream 2021 or line 2004.

The reactions taking place in cell 2011 are as follows:

$$2K_2CO_3 + H_2O \xrightarrow{2F} K_2C_2O_6 + 2 KOH + H_2$$

$$K_2CO_3 + H_2O \xrightarrow{2F} K_2CO_4 + H_2$$

The potassium hydroxide from cell 2011 may be used to convert any residual potassium bicarbonate in line 2021 to potassium carbonate, thus avoiding possible crystallization of bicarbonate and contamination of the potassium nitrate and potassium sulfate products. As pointed out earlier, potassium carbonate has a much higher solubility than potassium bicarbonate.

Makeup potassium required for producing potassium nitrate and potassium sulfate is provided as potassium hydroxide, conveniently made in electrolytic cell 2041 where potassium chloride is electrolyzed to produce chlorine and potassium hydroxide. A saturated solution of potassium chloride enters cell 2041 through line 2048, is electrolytically converted to chlorine at anode 2044 and to potassium hydroxide and hydrogen at cathode 2043. Chlorine passes from cell 2041 via line 2045 and hydrogen via line 2047. A cationic-selective ion-exchange membrane 2042 is used to obtain salt-free potassium hydroxide which passes from electrolytic cell 2041 via line 2040.

The potassium carbonate/potassium bicarbonate system performs numerous important functions in the practice of this invention. For example, in the treating step, this system insures substantial removal of sulfur dioxide and lower valence nitrogen oxides from the gas mixture. In product recovery, the system lowers the water solubility of potassium sulfate and potassium nitrate, making recovery of each more selective and higher in yield, thus reducing energy needs for evaporation and refrigeration.

The following data show the unexpectedly strong impact of potassium carbonate in reducing the solubilities of potassium sulfate and potassium nitrate in aqueous media. Potassium sulfate has a solubility at 70° C. of 19.5 grams in 100 milliliters of water, but only 0.11 gram in 100 milliliters of aqueous solution containing 68 grams of potassium carbonate. Potassium nitrate has a solubility at 20° C. of 33 grams in 100 milliliters of water, but only 2.8 grams in 100 milliliters of the above aqueous potassium carbonate solution at 20° C. Thus, potassium sulfate can be crystallized with substantially complete removal from aqueous potassium carbonate at temperatures of about 70° C., following which the potassium nitrate may be crystallized with increasing recoveries at lower temperatures, say from about 10° C. to about 50° C. Separation and recovery of substantially pure sulfate and nitrate products is an important and unexpected result of this process, and makes possible the recovery of commercial quantities of these products from gas mixtures containing low concentrations of sulfur dioxide and lower valence nitrogen oxides for the first time.

The following exemplify various features of the above described processes:

EXAMPLE I

A gas mixture consisting of 400 parts per million of nitric oxide and 99.96% nitrogen was passed in a stream countercurrent to an aqueous scrubbing solution consisting of 20% potassium carbonate and 1% hydrogen peroxide (stabilized) at 50° C. through a 10 foot glass column having a two inch diameter and packed with ½ inch Pall-type rings. The gas stream was fed at a rate corresponding to about 0.1 foot per second superficial gas velocity, and the liquid flow rate was just below the flooding point. The concentration of nitric oxide in the gas stream was reduced to about 30 part per million which corresponds to a removal efficiency of about 92%. The scrubbing solution was recirculated until the hydrogen peroxide concentration was reduced to approximately 0.1% without any loss in scrubbing efficiency.

The aqueous scrubbing solution was analyzed and the yield of potassium nitrate and potassium nitrite formed coresponded closely to the amount of nitric oxide removed from the gas mixture. The molar ratio of potassium nitrite to potassium nitrate was about 1:1 and the usage of hydrogen peroxide was 1.1 times the theoretical requirement.

EXAMPLE II

The same gas mixture treated in Example I was treated in the same equipment and under the same conditions as under Example I, except that a scrubbing solution was used consisting of about 18% potassium bicarbonate, about 6% potassium carbonate and about 1% hydrogen peroxide in water. The efficiency of nitric oxide removal from this gas stream was 91% and the ratio of potassium nitrate to potassium nitrite was about 1.2:1. The yield of potassium nitrate and potassium nitrite corresponded closely to the quantity of nitric oxide removed from the stream and the usage of stabilized hydrogen peroxide was about 1.05 times the theoretical requirement.

EXAMPLE III

The removal of nitric oxide was again tested using the equipment described in Example I but with an aqueous scrubbing solution consisting of about 18% potassium bicarbonate, about 6% potassium carbonate, about 10% potassium nitrate and about 1% hydrogen peroxide, again at 50° C. The nitric oxide removal efficiency from the gas stream remains at 92%. The treating solution was heated and evaporated after use to convert bicarbonate to carbonate and to adjust the potassium nitrate concentration to approximately 12%. The solution was cooled to 0° C. and nearly 100% pure potassium nitrate product was crystallized from this product aqueous media with little or no potassium carbonate or potassium nitrite contamination.

EXAMPLE IV

A gas mixture comprising 800 parts per million of sulfur dioxide and 99.92% nitrogen was tested in a 2-foot by 2-inch diameter absorption tower packed with ½-inch Pall-type rings using a gas velocity of about 2.0 foot per second and an aqueous solution including about 20% potassium carbonate. The pH of the aqueous media was about 11.2; the reaction temperature, about 50° C. Efficiency of sulfur dioxide removal was higher than 99%. Removal efficiency was then tested with an aqueous media including about 18% potassium bicarbonate and about 6% potassium carbonate. Removal efficiency was again higher than 99%. The pH of the scrubber solution was 9.2, and the temperature was again 50° C.

By contrast, removal of sulfur dioxide from the same gas stream with an aqueous solution containing 10% sodium sulfite at 50° C., in accordance with the Wellman-Lord process, produced a removal efficiency of only about 91% at peak, which then declined as the concentration of sodium bisulfite began to rise in the recycled aqueous scrubbing media. The pH of the sodium sulfite scrubbing solution was 7.2 at the beginning of the test.

EXAMPLE V

The solubilities in aqueous solution of potassium nitrate, potassium sulfate and potassium chloride are substantially reduced in the presence of potassium carbonate. As Table 1 below shows, an aqueous solution containing 67 grams of potassium carbonate in 100 milliliters of water reduces the solubility of potassium nitrate to one-tenth that in water without potassium carbonate present and that of potassium sulfate by greater than one hundredth that in water alone. Potassium chloride solubilities are reduced by one-fourth to one-eighth.

TABLE 1

SOLUBILITY OF $KNO_3$, $K_2SO_4$ and $KCl$ IN AQUEOUS $K_2CO_3$ SOLUTIONS IN GRAMS PER 100 MILLILITERS

| Temp., °C.: | IN WATER ALONE | | | IN AQUEOUS MEDIA INCLUDING 67 g $K_2CO_3$/100 ml SOLUTION | | |
|---|---|---|---|---|---|---|
| | 10 | 40 | 70 | 10 | 40 | 70 |
| $KNO_3$ | 21.5 | 64.0 | 138.0 | 2.80 | 6.00 | 13.00 |
| $K_2SO_4$ | 9.1 | 14.5 | 19.5 | 0.07 | 0.09 | 0.11 |
| $KCl$ | 31.0 | 40.0 | 48.5 | 4.00 | 8.00 | 12.00 |

EXAMPLE VI

In the practice of this invention, the removal of sulfur dioxide from flue gases may be further illustrated for the case of a 500 megawatt coal-fired power generating unit burning a coal containing 3.0-percent sulfur. The flue gas generated and fed to the treating section flows at a rate of 1,130,000 cubic feet per minute, a temperature of 150° C. and contains 2240 ppm (parts per million) of sulfur dioxide and 1000 ppm of nitrogen oxides. The treated gas discharged contains less than 10 ppm of sulfur dioxide, or a removal efficiency of 99+ percent, with the nitrogen oxides essentially unchanged.

The flue gas treating or contacting is conducted in a vertical disposed spray scrubber operating with cocurrent flow in which the flue gas is traveling at 5 to 15 feet per second, usually at 10 feet per second, and the scrubbing media is sprayed into the gas stream at a rate of 5,000 to 15,000 gallons per minute, preferably at 10,000 gallons per minutes. The product aqueous scrubbing media in a quantity of 400 to 600 gallons per minute, preferably 500 gallons per minute, and containing potassium sulfite, potassium carbonate and potassium bicarbonate is fed to the recovery system where the potassium sulfite is oxidized with air to potassium sulfate and the potassium bicarbonate is converted to potassium carbonate. The product aqueous media is cooled to approximately 50° C. and the potassium sulfate crystallized therefrom and separated by centrifugation. The potassium sulfate product (dry basis) amounts to approximately 880 tons per day.

The makeup potassium required for the potassium sulfate is supplied to the aqueous mother liquor being recycled to the flue gas contactor as a 10 to 25 percent aqueous potassium hydroxide solution and is produced from potassium chloride by electrolysis. The electrolytic cells operate at 90° C. and also produce gaseous chlorine and hydrogen. Approximately 630 tons per day of potassium hydroxide (real) are fed to the sulfur dioxide removal system.

Following the removal of sulfur oxides the same flue gas stream is treated for the removal of oxides of nitrogen in the second stage of the treating system. The flue gas is fed to the treating section at a flow rate of about 1,200,000 cubic feet per minute, a temperature of 54° C. and contains 1000 ppm of nitrogen oxides. The treated gas discharged following the treatment contains approximately 100 ppm of nitrogen oxides, or a removal efficiency of approximately 90 percent.

The flue gas treating or contacting is conducted in multi-staged vertical scrubber in which the flue gas is traveling at 1 to 15 feet per second, usually a 5 feet per second, and the scrubbing media is sprayed into the gas stream at a rate of 5,000 to 20,000 gallons per minute, preferably at 12,000 gallons per minute. The product aqueous scrubbing media in a quantity of 400 to 500 gallons per minute and containing potassium nitrate, potassium nitrite, potassium carbonate and potassium bicarbonate, is fed into the recovery system.

Carbon dioxide gas is introduced into the aqueous media to convert the potassium carbonate to potassium bicarbonate and lower the pH to below pH 8.0. Sufficient hydrogen peroxide is provided to oxidize the potassium nitrite to potassium nitrate. The aqueous media then passes to a decarbonation tower, where the potassium bicarbonate is converted to potassium carbonate, following which the resulting solution is cooled in a crystallizer to 20° to 40° C., preferably 30° C., and the potassium nitrate crystallized and separated by centrifugation. The bone-dry potassium nitrate product amounts to approximately 230 tons per day.

The makeup potassium required for the potassium nitrate is supplied to the aqueous mother liquor being recycled to the scrubber as a 10 to 25 percent aqueous potassium hydroxide and is produced from potassium chloride by electrolysis. The electrolytic cells operate at 90° C. and also produce chlorine and hydrogen. Approximately 130 tons per day of potassium hydroxide (real) are fed to the nitrogen oxides removal system.

An oxidant is added to the aqueous mother liquor as it is being recycled to the scrubber. The oxidant can be supplied as hydrogen peroxide, made by chemical means, or as potassium peroxycarbonate, made by electrolytic means, and its feed quantity is in excess of the stoichiometric equivalent.

I claim:

1. A process for removing oxides of sulfur from a combustion gas mixture including carbon dioxide and sulfur dioxide comprising:
   a. treating said gas mixture in a zone with an aqueous media which includes the carbonate-bicarbonate of potassium to convert all of the sulfur dioxide absorbed by the aqueous media to dibasic potassium sulfite to form a product aqueous media having a pH in the range of 7–10 and comprising dibasic potassium sulfite, additional monobasic potassium bicarbonate, and additional dibasic potassium carbonate;
   b. heating said product aqueous media to convert at least a portion of the monobasic potassium bicarbonate to carbon dioxide and dibasic potassium carbonate;
   c. treating the product aqueous media from Step b. to convert at least a portion of said dibasic potassium sulfite to potassium sulfate by oxidation with hydrogen peroxide or an oxygen-containing gas;
   d. crystallizing and recovering at least a portion of said potassium sulfate from the product aqueous media in the presence of dibasic potassium carbonate at a pH higher than pH=8.0; and
   e. recycling the product aqueous media to the zone of said gas treating.

2. The process of claim 1 in which part of the potassium is replaced by sodium in the form of sodium carbonate-bicarbonate in an amount corresponding to the molar quantity of sulfur oxides removed to form dibasic sodium sulfite, the excess of alkali metal greater than this amount being present in the form of potassium carbonate-bicarbonate.

3. The process of claim 1, in which potassium is replaced by sodium.

4. The process of claim 1, wherein at least a portion of said carbon dioxide is recovered.

5. The process of claim 1 including effecting said oxidation and conversion of said monobasic potassium bicarbonate to carbon dioxide and potassium carbonate simultaneously.

6. The process of claim 5 wherein potassium is replaced by sodium.

7. A process for removing oxides of sulfur and nitrogen from a gas mixture including carbon dioxide, sulfur dioxide and nitrogen dioxide comprising:
   a. treating said gas mixture in a zone with an aqueous media which includes the carbonate-bicarbonate of an alkali metal to convert all of the sulfur dioxide absorbed by the aqueous media to dibasic alkali metal sulfite and the nitrogen dioxide to alkali metal nitrite and nitrate to form a product aqueous media having a pH in the range of 7-10 and comprising dibasic alkali metal sulfite, alkali metal nitrite, alkali metal nitrate, additional monobasic alkali metal bicarbonate, and additional dibasic alkali metal carbonate;
   b. treating the product aqueous media from Step a. to convert said dibasic alkali metal sulfite to alkali metal sulfate with hydrogen peroxide or an oxygen-containing gas;
   c. crystallizing and recovering said alkali metal sulfate in the product aqueous media from Step b. at a pH higher than pH=8.0 in the presence of alkali metal carbonate;
   d. then cooling said product aqueous media from Step c., after removal of said alkali metal sulfate, to recover said alkali metal nitrate by crystallization; and
   e. recycling the product aqueous media back to the zone of said gas treating.

8. The process of claim 7 wherein potassium is replaced by sodium.

9. A process for removing oxides of sulfur and nitrogen from a gas mixture including carbon dioxide, sulfur dioxide and nitrogen dioxide comprising:
   a. treating said gas mixture in a zone with an aqueous media which includes the carbonate-bicarbonate of an alkali metal to convert all of the sulfur dioxide absorbed by the aqueous media to dibasic alkali metal sulfite and the nitrogen dioxide to alkali metal nitrite and nitrate to form a product aqueous media having a pH in the range of 7-10 and comprising dibasic alkali metal sulfite, alkali metal nitrite, alkali metal nitrate, additional monobasic alkali metal bicarbonate, and additional dibasic alkali metal carbonate;
   b. lowering the pH of the product aqueous media to less than pH=9 to facilitate the oxidation of alkali metal nitrite to alkali metal nitrate by treating said product aqueous media with carbon dioxide, sulfuric acid or nitric acid;
   c. treating the product aqueous media from Step b. with hydrogen peroxide or an oxygen-containing gas to oxidize the alkali metal nitrite to alkali metal nitrate and the alkali metal sulfite to alkali metal sulfate;
   d. heating the product aqueous media from Step c. to convert at least a portion of the monobasic alkali metal bicarbonate to carbon dioxide and dibasic alkali metal carbonate;
   e. crystallizing and recovering said alkali metal sulfate from the product aqueous media from Step d. at a pH higher than pH=8.0 in the presence of dibasic alkali metal carbonate;
   f. cooling the product aqueous media from Step e. to recover alkali metal nitrate by crystallization; and
   g. recycling the product aqueous media from Step f. back to the zone of said gas treating.

10. The process of anyone of claims 7, 8 or 9 in which the alkali metal is potassium.

11. The process of either claim 8 or 9 in which the carbon dioxide liberated is recovered.

* * * * *